(12) United States Patent
Maziers

(10) Patent No.: US 9,327,430 B2
(45) Date of Patent: May 3, 2016

(54) ROTOMOULDED STRUCTURAL PARTS HAVING ASYMMETRICAL LAYERING

(75) Inventor: Eric Maziers, Seneffe (BE)

(73) Assignee: TOTAL RESEARCH & TECHNOLOGY FELUY, Seneffe (Feluy) (BG)

( * ) Notice: Subject to any disclaimer, the term of this patent is extended or adjusted under 35 U.S.C. 154(b) by 865 days.

(21) Appl. No.: 13/120,670

(22) PCT Filed: Oct. 1, 2009

(86) PCT No.: PCT/EP2009/062735
§ 371 (c)(1),
(2), (4) Date: Jan. 4, 2012

(87) PCT Pub. No.: WO2010/037805
PCT Pub. Date: Apr. 8, 2010

(65) Prior Publication Data
US 2012/0151844 A1    Jun. 21, 2012

(30) Foreign Application Priority Data

Oct. 2, 2008   (EP) ..................................... 08165701

(51) Int. Cl.
| | |
|---|---|
| *B29C 41/06* | (2006.01) |
| *B29C 41/22* | (2006.01) |
| *B29C 41/46* | (2006.01) |
| *B29C 33/02* | (2006.01) |
| *B29C 41/00* | (2006.01) |
| *B29C 41/38* | (2006.01) |
| *B29L 31/30* | (2006.01) |

(52) U.S. Cl.
CPC ................. *B29C 41/06* (2013.01); *B29C 41/22* (2013.01); *B29C 41/46* (2013.01); *B29C 33/02* (2013.01); *B29C 41/003* (2013.01); *B29C 41/38* (2013.01); *B29C 2033/023* (2013.01); *B29L 2031/3005* (2013.01); *Y10T 428/1352* (2015.01); *Y10T 428/1376* (2015.01)

(58) Field of Classification Search
CPC ..................... B29C 41/04–41/06; B29C 41/22
See application file for complete search history.

(56) References Cited

U.S. PATENT DOCUMENTS

| | | | | |
|---|---|---|---|---|
| 3,316,339 | A | * | 4/1967 | Breneman ...................... 264/310 |
| 3,455,483 | A | * | 7/1969 | Inklaar .......................... 220/645 |
| 4,562,025 | A | * | 12/1985 | Gray ....................... B29C 41/18 264/126 |
| 4,894,004 | A | * | 1/1990 | Brault ..................... B29C 41/18 249/105 |
| 5,234,653 | A | * | 8/1993 | Buzzoni .............. B29C 33/0038 264/219 |
| 5,457,159 | A | | 10/1995 | Fassina et al. |
| 5,648,030 | A | * | 7/1997 | Pemberton .............. B29C 41/04 264/245 |
| 6,124,400 | A | | 9/2000 | Chien |

(Continued)

FOREIGN PATENT DOCUMENTS

| | | | |
|---|---|---|---|
| GB | 1150018 A | * | 4/1969 |
| WO | 2004045849 A1 | | 6/2004 |

(Continued)

OTHER PUBLICATIONS

Teflon. World of Molecules [online] [retrieved on Jul. 24, 2014]. Retrieved from the Internet: <URL: http://www.worldofmolecules.com/materials/teflon.htm>.*

(Continued)

*Primary Examiner* — Matthew Daniels

(57) ABSTRACT

This invention discloses a method for preparing rotomolded articles having asymmetrical layering.

19 Claims, 3 Drawing Sheets

(56) References Cited

U.S. PATENT DOCUMENTS

Figure 1:
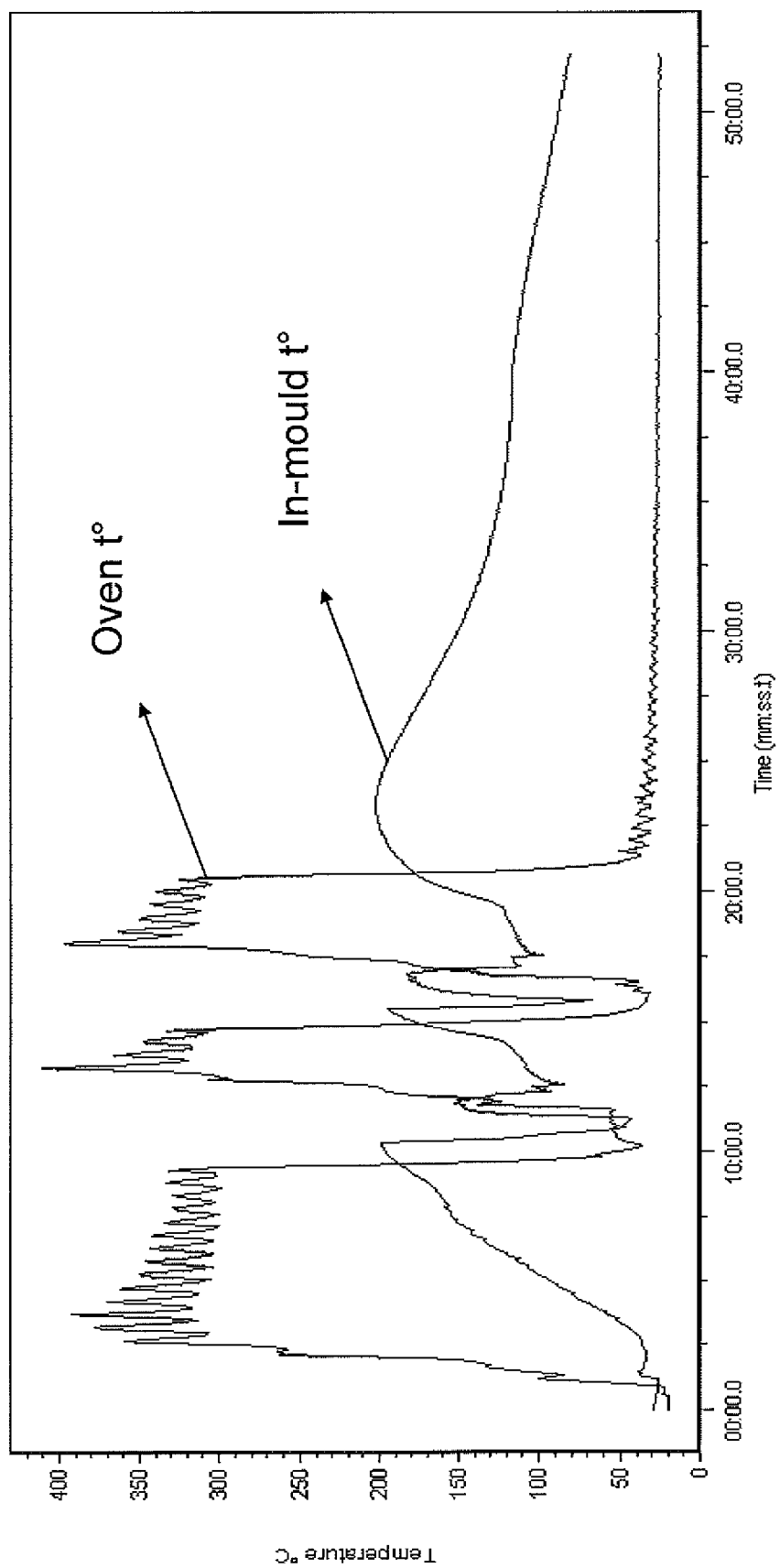

| | | | |
|---|---|---|---|
| 6,383,437 B1 * | 5/2002 | Grieve | 264/246 |
| 6,524,509 B1 * | 2/2003 | Shope | B29C 39/023 264/113 |
| 6,982,057 B2 * | 1/2006 | King et al. | 264/255 |
| 7,169,453 B2 * | 1/2007 | Le Roy et al. | 428/36.7 |
| 2004/0096605 A1 | 5/2004 | King et al. | |
| 2006/0088622 A1 * | 4/2006 | Persico | 425/435 |
| 2006/0251835 A1 * | 11/2006 | Maziers et al. | 428/35.7 |
| 2009/0039548 A1 * | 2/2009 | Claussen | 264/255 |
| 2010/0047596 A1 | 2/2010 | Maziers | |

FOREIGN PATENT DOCUMENTS

| | | | |
|---|---|---|---|
| WO | WO 2006120188 A1 * | 11/2006 | |
| WO | WO 2006136572 A1 * | 12/2006 | B29C 41/003 |

OTHER PUBLICATIONS

Bruins, P.F. Basic Principles of Rotational Molding. N.Y., Gordon and Breach, 1971. pp. 42, 53.*

"Rottaziionalle Multtistrato", PLASTDESIGN, XP002485907, Jan. 2006, pp. 95-96.

"Leonardo Rotomolding Machine and TP-Seal Technology", Maziers, E., Donizetti, G., XP002514830, Apr. 2008, pp. 48-52.

Office Action issued in CN Patent Application No. 2009801476493, dated May 6, 2013 and English translation thereof (11 pages).

Annechini D. et al., "Some New Results on Rotational Molding of Metallocene Polyethylenes" Jan. 1, 2001; Society of Plastics Engineers. Annual Technical Conference (Antec). Proceedings, Society of Plastics Engineers, US -vol. 1, pp. 1-5.

* cited by examiner

ROTOMOULDED STRUCTURAL PARTS HAVING ASYMMETRICAL LAYERING

CROSS-REFERENCE TO RELATED APPLICATIONS

This application claims the benefit of PCT/EP2009/062735, filed Oct. 1, 2009, which claims priority from EP 08165701.7, filed Oct. 2, 2008.

This invention relates to the field of structural parts for motor vehicles or airplanes and more specifically to car doors, panels or design parts prepared by rotomoulding, and having asymmetrical layering.

Polyethylene represents more than 80% of the polymers used in the rotomoulding market. This is due to the outstanding resistance of polyethylene to thermal degradation during processing, to its easy grinding, good flowability, and low temperature impact properties.

Rotomoulding is used for the manufacture of simple to complex, hollow plastic products. It can be used to mould a variety of materials such as polyethylene, polypropylene, polycarbonate polyamide, or polyvinyl chloride (PVC). Linear low density polyethylene is preferably used as disclosed for example in "Some new results on rotational molding of metallocene polyethylenes" by D. Annechini, E. Takacs and J. Vlachopoulos in ANTEC, vol. 1, 2001.

Polyethylenes prepared with a Ziegler-Natta catalyst are generally used in rotomoulding, but metallocene-produced polyethylenes are desirable, because their narrow molecular distribution allows better impact properties and shorter cycle time in processing.

The metallocene-produced polyethylenes of the prior art (see ANTEC, vol. 1, 2001) suffer from high shrinkage and warpage and for some applications from their whiteness in their natural state.

Plastoelastomeric compositions such as described in U.S. Pat. No. 5,457,159 can also be used in rotomoulding, but they require complex processing steps of mixing and vulcanisation.

U.S. Pat. No. 6,124,400 discloses the use for rotomoulding of polymer alloys containing semi-crystalline polyolefin sequences with chains of different controlled microstructure prepared in a "one-pot" polymerisation process from a single monomer. The polymerisation of these polymer alloys requires a complex catalyst system comprising organometallic catalyst precursors, cationic forming cocatalysts and cross-over agents.

It is desired to produce articles prepared with two or more layers of similar or dissimilar material in order to improve the final properties of the finished product. For example, it may be desirable to combine the good barrier, temperature stability, paintability and creep resistance of polyamide with the acceptable food contact and qualities of polyethylene, such as for example low cost and good impact at low temperature. It is known however that polyamide does not adhere to polyethylene and a bonding layer or cross-linking is therefore necessary in order to insure structural integrity.

Some applications such as car doors or panels require multilayer rotomoulded articles wherein parts of the external skin layer must have different properties, thereby requiring post-moulding alterations and handling. For example the outside part of the car door needs to be painted whereas its inside part preferably has a soft touch: these two parts should therefore be prepared from different material.

It is an aim of the present invention to prepare rotomoulded multilayer structural parts wherein the layering is asymmetrical.

It is also an aim of the present invention to prepare rotomoulded multilayer structural parts wherein portions of the articles' external surface are made from different polymers.

It is another aim of the present invention to prepare rotomoulded multilayer structural parts wherein portions of the articles' external surface have different properties.

It is another aim of the present invention to prepare large multilayer rotomoulded articles that can be processed easily and quickly.

It is a further aim of the present invention to prepare large multilayer rotomoulded articles having good stiffness and rigidity while keeping elasticity.

It is yet another aim of the present invention to prepare large multilayer rotomoulded articles having controlled wall thickness.

Any one of these aims is, at least partially, fulfilled by the present invention.

Accordingly, the present invention discloses a method for preparing a rotomoulded article having asymmetrical layering that comprises the steps of:
 a) providing a mould for rotomoulding consisting of 2 or more portions thermally insulated from one another;
 b) thermally insulating one or more portions of the mould, leaving the remaining portions not insulated;
 c) heating the non-insulated portions of the mould;
 d) injecting a first polymeric material in the heated mould and submitting the mould to rotation about two perpendicular axes;
 e) removing the thermal insulation;
 f) injecting a second polymeric material in the heated mould, different from the first polymeric material of step d), and submitting the mould to rotation about two perpendicular axes;
 g) optionally repeating steps b) through f) or step f) alone as many times as desired;
 h) retrieving the rotomoulded article having asymmetrical layering.

The mould used in the present invention comprises at least two portions separated from one another, one or more of which are kept thermally insulated while the first layer of resin is injected into the mould. This can be achieved by jacketing one or more portions of the mould, or by inserting physical barriers that are either removed or molten after injection of the first layer. Alternatively, the mould is heated through ducts designed to be run through by heat-regulating fluid, said ducts being realised by grooves on the external surfaces of the mould and wherein portions of the mould can be heated whereas other portions can be cooled down. Such mould is commercially available from Persico under the name Leonardo®.

The first resin constitutes the outer layer of the finished article for the part of the mould that is not thermally insulated. It can be selected from a composition comprising from 40 to 100 wt %, based on the weight of the composition, of homopolymers or copolymers of ethylene and/or propylene, and/or polyamide, and/or functional fluoropolymer and/or ethylene vinyl alcohol copolymer (EVOH), and/or plastomer or a mixture thereof, and from 0 to 60 wt % of a functionalised polyolefin (FPO) or of a PO grafted to a non-polyolefin (NPO) in the form of a block copolymer (PO)g-NPO or of an ionomer or a combination thereof.

Preferably, the first polymeric material comprises polyamide, more preferably it is polyamide.

The polyamides that can be used in the present invention are the products of condensation:
 of one or more amino acids such as aminocaproic acid, 7-aminoheptanoic acid, 11-aminoundecanoic acid and 12-aminododecanoic acid of one or more lactams such as caprolactam, oenantholactam and lauryllactam;

of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic acid, terephthalic acid, adipic acid, azelaic acid, suberic acid, sebacic acid and dodecanedicarboxylic acid.

As examples of polyamides, mention may be made of PA 6 and PA 6-6, PA 11.

It is also advantageously possible to use copolyamides. Advantageously, the copolyamide is chosen from PA 6/12, PA 6/6-6.

Mixtures of polyamide and polyolefins can also be used in the first resin composition. The polyamide is as disclosed hereabove. The polyolefin can be a functionalised or a non-functionalised polyolefin or can be a mixture of at least one functionalised and/or of at least one non-functionalised polyolefin.

More generally, amine terminated materials can also be used in the first resin composition and they are preferably selected from polyamide diamine (PAdiNH$_2$).

The name diamine polyamide, PAdiNH$_2$, refers to a polyamide which satisfies the following criteria:
  it has a certain amount of chains ending on both sides with an amine group (NH$_2$)
  the amount of chains ending on both sides with an amine group (NH$_2$) is greater than that of diacid chains (if any)
  the concentration of amine groups is greater overall than the concentration of acid groups
  a PAdiNH$_2$ is obtained by adding a diamine as chain limiter or, in the case of polyamides based on diamine and on diacid such as, for example, PA6-6, by adding more diamine comonomer than diacid comonomer.

The polyamides that can be used in the first resin composition may also be impact-modified polyamides.

The second layer constitutes the outer layer of the finished article for the part of the mould that was thermally insulated during the injection of the first resin. It is selected from a resin that can be selected from a composition comprising from 40 to 99 wt %, based on the weight of the composition, of homopolymers or copolymers of ethylene and/or propylene, and/or polyamide, and/or functional fluoropolymer or a mixture thereof, and from 1 to 60 wt % of a functionalised polyolefin (FPO) or of a PO grafted to a non-polyolefin (NPO) in the form of a block copolymer (PO)g-NPO), or of an ionomer, or of a terpolymer comprising a compatibilising and a coupling agent, or a combination thereof, with the restriction that it is different from the composition of the first layer.

Preferably, it is selected from polyethylene or isotactic polypropylene or syndiotactic polypropylene, more preferably it is polyethylene.

In a preferred embodiment according to the present invention, the second resin composition comprises from 70 to 98 wt % and more preferably from 80 to 95 wt % of polyethylene or isotactic polypropylene or syndiotactic polypropylene, and preferably from 30 to 2 wt % and more preferably from 20 to 5 wt % of functionalised polyolefin or ionomer or mixture thereof. Most preferably the resin composition consists of from 90 to 95 wt % of polyethylene, the remaining part being a mixture of grafted polyethylene and ionomer.

The second resin composition comprises homopolymers or copolymers of ethylene and an ionomer and/or a grafted polyolefin. In this description, copolymers are prepared from one monomer and one or more comonomers. The second resin composition may advantageously be replaced by a dry blend of metallocene-prepared polyethylene resins having different properties in order to tailor the properties of the layer. Said composition preferably comprises a dry blend of from 20 to 80 wt % based on the total weight of the 2 polyethylenes, of a first metallocene produced polyethylene and from 20 to 80 wt % of second metallocene produced polyethylene having density and melt flow different from those of the first polyethylene. More preferably it comprises from 40 to 60 wt % of first metallocene produced polyethlene and from 40 to 60 wt % of second metallocene produced polyethlene.

In a preferred embodiment according to the present invention, the second resin composition comprises from 70 to 99 wt %, based on the weight of said composition, of the blend of first and second polyethylene resins, more preferably from 80 to 99 wt % and most preferably from 85 to 98 wt %, and preferably from 1 to 30 wt %, more preferably from 1 to 20 wt % and most preferably from 2 to 15 wt % of ionomer or grafted polyolefin or combination thereof.

The preferred polyethylene according to the present invention is a homo- or co-polymer of ethylene produced with a catalyst comprising a metallocene on a silica/aluminoxane support. More preferably, the metallocene component is ethylene-bis-tetrahydroindenyl zirconium dichloride or dimethylsilylene-bis(2-methyl-4-phenyl-indenyl) zirconium dichloride. The most preferred metallocene component is ethylene-bis-tetrahydroindenyl zirconium dichloride.

The grafted polyolefins, if present are polyolefins grafted with a material that provides polarity and/or reactivity and they therefore depend upon the nature of the adjacent layers. Preferably in the present invention, the polyolefins are grafted with anhydride and preferably, the polyolefin is polyethylene or polypropylene, more preferably, it is polyethylene. Alternatively, an ionomer is used. Grafted polyethylene provides excellent adhesion properties whereas ionomers enhance mechanical properties. In a more preferred embodiment according to the present invention, a mixture of ionomer and grafted polyethylene is added to the polyethylene composition.

An ionomer is a polyelectrolyte that comprises copolymers containing both electrically neutral repeating units and a fraction of ionised units, usually representing at most 15 percent of the polymer. They link in such a way that, even though they are stiff at room temperature, the bonds may be broken down thermally and the new linkages will cause the material to act as though it were a thermoplastic material. The ionic attractions that result strongly influence the polymer properties, especially its mechanical properties.

In an ionomer, the nonpolar chains are grouped together and the polar ionic groups are attracted to each other. This allows thermoplastic Ionomers to act in ways similar to that of cross-linked polymers or block copolymer, but in fact they are called reversible cross-linkers. When heated, the ionic groups lose their attractions for each other and the chains become mobile. The chains motion increases with increasing temperature and the groups can no longer stay in their clusters. This produces a polymer that has the properties of an elastomer and the processability of a thermoplastic.

Suitable ionomers can for example be selected from polyethylene-co-methacrylic acid). This polymer is a sodium or zinc salt of copolymers derived from ethylene and methacrylic acid.

Grafted polyethylene provides excellent adhesion properties whereas ionomers enhance mechanical properties.

The second polymeric composition of the present invention has a melt index of from 0.5 to 30 dg/min, preferably from 1 to 25 dg/min and more preferably from 2 to 20 dg/min. The density ranges between 0.920 to 0.965 g/cc, preferably from 0.930 to 0.960 g/cc. The melt flow index MI2 is measured following the method of standard test ASTM D 1283 at a temperature of 190° C. and a load of 2.16 kg. The density is measured following the method of standard test ASTM D 1505 at 23° C.

If a dry blend of polyethylenes is used for the second polymeric material, the melt index of the first polyethylene resin preferably used in the present invention is typically at least equal to 0.5 dg/min, preferably of at least 1 dg/min. It is preferably at most equal to 25 dg/min, preferably of at most 20 dg/min. The melt index of the second polyethylene resin preferably used in the present invention is typically of at least 1 dg/min, preferably of at least 5 dg/min. It is preferably of at most 30 dg/min, preferably of at most 25 dg/min. The density of the first homo- and co-polymers of ethylene that can be used in the blend is preferably of at least 0.920 g/cc, preferably of at least 0.930 g/cc. It is of at most 0.965 g/cc, preferably of at most 0.960 g/cc. The density of the second polyethylene resin preferably used in the blend is typically of at least 0.930 g/cc, preferably of at least 0.935 g/cc. It is of at most 0.965 g/cc, preferably of at most 0.960 g/cc.

The polyethylene of the present invention may also have a bi- or multimodal molecular weight distribution, i.e. they may be a blend of two or more polyethylenes with different molecular weight distributions, which can be blended either physically or chemically, i.e. produced sequentially in two or more reactors.

The polydispersity D of the polyethylene suitable for the present invention is in the range 2 to 20, preferably 2 to 15, more preferably less than or equal to 10, and most preferably less than or equal to 8, the latter range being typically associated with the preferred metallocene-prepared polyethylene resins. The polydispersity index D is defined as the ratio Mw/Mn of the weight average molecular weight Mw over the number average molecular weight Mn.

The resins of the present invention may also comprise other additives such as for example antioxidants, acid scavengers, antistatic additives, fillers, slip additives or anti-blocking additives, processing aid, HALS and UV filters.

Polypropylene can also be used either for the first or the second resin composition. For syndiotactic polypropylene, a cyclopentadieny-fluorenyl ligand is preferred and for isotactic polypropylene, a bis-indenyl or a bis-tetrahydroindenyl is preferred.

Polypropylene that can be used in the present invention typically have a melt flow index MI2 of from 1.5 to 100 g/10 min. The melt flow index MI2 is measured following the method of standard test ASTM D 1238 at a temperature of 230° C. and under a load of 2.16 kg.

Polyamide is known to provide excellent barrier properties, temperature stability at elevated temperature of up to 115° C., good environmental stress crack resistance (ESCR). In addition, it can be easily painted.

Polypropylene has an excellent stress crack resistance, high temperature creep and stifnesss, whereas polyethylene has an excellent impact resistance. Polyethylene additionally has a soft touch.

The rotomoulded articles may additionally comprise layers prepared from foamed polyethylene in order to produce parts having good resilience and light weight. Plastomers can also be used in external layers in order to produce surfaces having soft touch.

The resins can be used in powder form or pellet form or a mixture thereof.

An important application of the present invention is the preparation of automobile parts such as for example car doors or dashboards. In car door applications, the exterior part of the door needs to be painted and thus is preferably prepared from polyimide whereas the interior part of the door which preferably has a soft touch may be prepared from polyethylene or plastomer. Instead of welding two parts prepared scparatly-separately from different resins, the present invention provides a method for preparing the door in a single mould, thus gaining time, efficiency, higher structural properties and providing a better finished product.

Multiple layers object can be prepared either by manual introduction of material during the moulding cycle, or by the use of a drop-box, or by a one-shot system.

Manual addition involves moving the mould from the oven, removing a vent tube or plug that creates an opening in the part and adding more material using a fennel or wand. This operation must be repeated for each additional layer.

A drop-box typically contains a single material layer and it is an insulated container that holds material until it is released at the appropriate time during the cycle. The signal for release of material is usually transmitted as a pressure pulse via the airline through the arm of the machine. The insulation must be kept cool to prevent the material inside the box from melting.

In either method, there are two critical factors:
the temperature at which the subsequent layer is added: it is critical for determining the wall thickness of the previous skin formed and how well the two layers may be bound together;
the time elapsed before addition of the subsequent layer of material: if the mould is at rest for too long, material that has already adhered to the wall may sag.

It is possible to reduce these problems by lowering the melt index of the first layer and/or by reducing the injection temperature of the next layer, and/or by cooling the mould slightly before injection or the next layer.

The cycle time necessary to produce multilayer rotomoulded articles depends upon the number of layers and upon the mass injected for each layer.

The mould is typically cooled with cold air or cold water or a mixture thereof.

The thickness of each layer is determined by the size of the final product, by the desired properties and by the cost: it can vary from 0.3 mm up to several cm.

LIST OF FIGURES

FIG. 1 represents the oven and mould temperature profiles expressed in ° C. as a function of time expressed in minutes for an asymmetric article comprising three layers.

Figure 2:
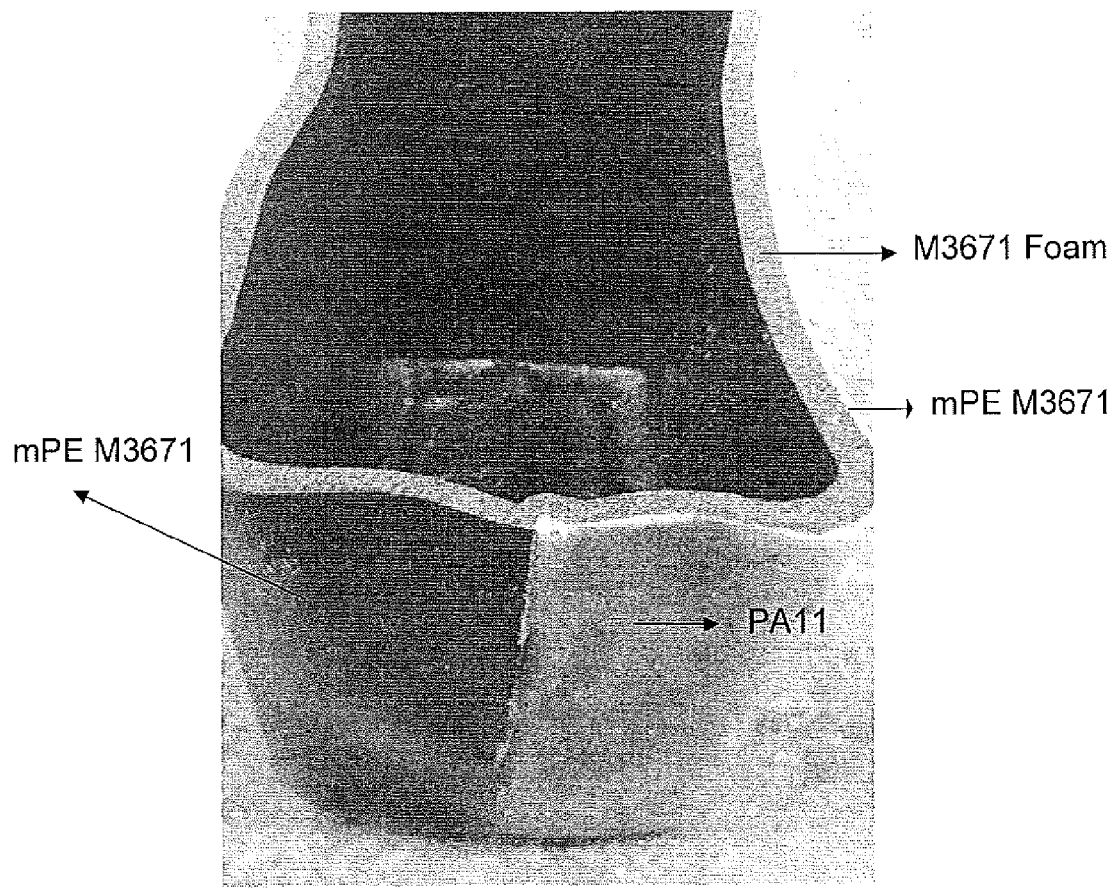

FIG. 2 represents a cross section of an asymmetrical three layer rotomoulded article wherein a first polyamide layer covers part of the article's external surface, a second polyethylene layer acts as external layer for the remaining part of the article's surface and acts as second layer beneath the polyamide layer for the other part of the article and a third foamed polyethylene layer acts as innermost layer of the rotomoulded article.

Figure 3:
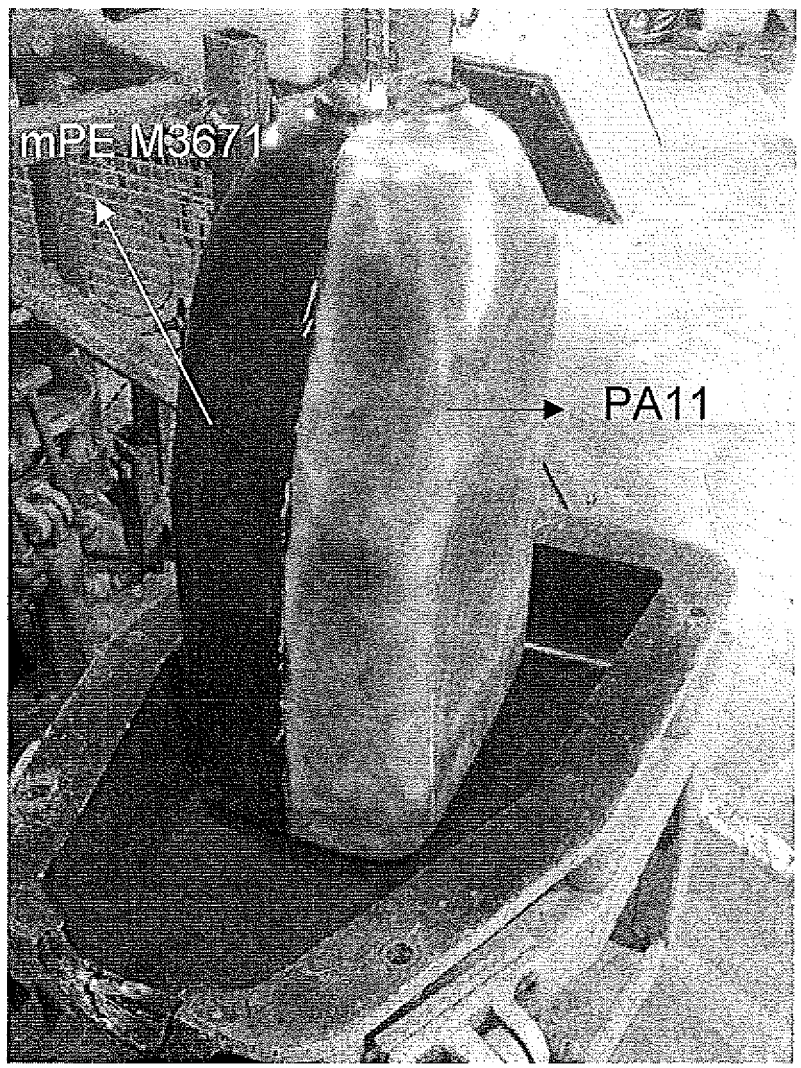

FIG. 3 represents a full view of the asymmetrical rotomoulded article of FIG. 2, showing that a portion of the external surface is prepared from polyamide and the remaining portion is prepared from polyethylene.

EXAMPLES

An asymmetrical rotomoulded article was prepared as follows.

The oven was pre-heated to a temperature of 350° C.

One half of the mould was lined with a teflon sheet in order to separate out said half of the mould.

A first shot of 150 g of polyamide PA11 was injected into the mould which was then placed in the oven and rotated around two mutually perpendicular axes for a period of time of 10 minutes, with a peak internal air temperature (PIAT) of about 190° C. The mould was removed from the oven and opened in order to remove the teflon insulating sheet.

A second shot of 350 g of polyethylene resin was then injected into the mould. The resin is sold by Total Petrochemicals under the name M3670® and consists of 93 wt %, based on the weight of M3670® resin, of resin M4041 UV® also sold by Total Petrochemicals, 6 wt % of polyethylene grafted with maleic anhydride sold by Dupont under the name Bynel 42E703® and 1 wt % of ionomer sold by Dupont under the name Surlyn 1650-E®.

The mould was placed in the oven and rotated around two mutually perpendicular axes for a period of time of 5 minutes, with a peak internal air temperature (PIAT) of about 180° C.

The mould was removed from the oven and a third shot of 300 g of the same M3670® resin additivated with 2.5 wt %, based on the total weight of the third shot, of chemical blowing agent Genitron OB®, commercially available from Lanxess Distribution GmbH.

The mould was placed again in the oven and rotated around two mutually perpendicular axes for a period of time of 5 minutes, with a peak internal air temperature (PIAT) of about 180° C.

The mould was then removed from the oven, cooled with air and opened to allow demoulding.

The temperature profiles in the oven and in the mould are presented in FIG. 1. A cross section of the three-layer rotomoulded article can be seen in FIG. 2 and a full view of the same rotomoulded article is presented in FIG. 3.

The invention claimed is:

1. A method for preparing a rotomoulded article having asymmetrical layering that comprises the steps of:
   a) providing a mould for rotomoulding comprising 2 or more portions insulated from one another;
   b) thermally insulating one or more portions of the mould, and leaving remaining one or more portions of the mould not thermally insulated, wherein thermally insulating the one or more portions of the mould is achieved by lining the one or more portions of the mould with a thermally insulating sheet that separates the one or more portions of the mould that are thermally insulated from the one or more portions of the mould that are not thermally insulated;
   c) heating the one or more portions of the mould that are not thermally insulated;
   d) injecting a first polymeric material in the mould and submitting the mould to rotation about two perpendicular axes, said first polymeric material constituting an outer layer of a finished rotomoulded article for the one or more portions of the mould that are not thermally insulated, and wherein said first polymeric material is a first composition comprising:
      from 40 to 100 wt %, based on a weight of the first composition, of homopolymers or copolymers of ethylene and/or propylene, and/or polyamide, and/or functional fluoropolymer or a mixture thereof, and
      from 0 to 60 wt % based on the weight of the first composition of a functionalised polyolefin (FPO) or of a polyolefin (PO) grafted to a non-polyolefin (NPO) in the form of a block copolymer ((PO)g-NPO) or of an ionomer or a combination thereof;
   e) opening the mould and removing the thermally insulating sheet;
   f) injecting a second polymeric material in the mould and submitting the mould to rotation about two perpendicular axes, wherein the second polymeric material is different from the first polymeric material of step d), wherein said second polymeric material constitutes an outer layer of the finished rotomoulded article for the one or more portions of the mould that were thermally insulated during the injection of the first polymeric material and said second polymeric material is a second composition comprising:
      from 70 to 99 wt %, based on the weight of said second polymeric material, of a polyethylene resin; and
      from 1 to 30 wt % of an ionomer, or from 1 to 30 wt % of a combination of an ionomer and a grafted polyolefin;
   g) optionally repeating steps b) through f) or step f) alone; and
   h) retrieving the rotomoulded article having asymmetrical layering.

2. The method of claim 1 wherein the first polymeric material is polyamide.

3. The method of claim 1 wherein the second polymeric material comprises from 70 to 99 wt %, based on the weight of said second polymeric material, of the polyethylene resin and from 1 to 30 wt % of the combination of ionomer and the grafted polyolefin.

4. The method of claim 1, wherein the second polymeric material comprises a blend of from 40 to 60 weight percent of a first polyethylene and from 40 to 60 weight percent of a second polyethylene.

5. The method of claim 4, wherein the first polyethylene has a melt index of at least 0.5 dg/min and at most 25 dg/min and a density of at least 0.920 g/cc and at most 0.965 g/cc; and wherein the second polyethylene has a melt index of at least 1 dg/min and at most 30 dg/min and a density of at least 0.930 g/cc and at most 0.965 g/cc.

6. The method of claim 1, wherein the polyethylene of the second polymeric material has a polydispersity of from 2 to 20.

7. The method of claim 1, wherein the first polymeric material comprises polypropylene having a melt index of from 1.5 to 100 g/10 min determined in accordance with ASTM D 1238 at a temperature of 230° C. and a load of 2.16 kg.

8. The method of claim 1, further comprising, prior to retrieving the rotomoulded article having asymmetrical layering, injecting a third composition comprising a polyethylene and a chemical blowing agent and submitting the mould to rotation about two perpendicular axes, wherein the retrieved rotomoulded article having asymmetrical layering has a foamed polyethylene layer as an innermost layer of the rotomoulded article.

9. The method of claim 1, wherein the second composition has a melt index of from 0.5 to 30 dg/min determined in accordance with ASTM D 1238 at a temperature of 190° C. and a load of 2.16 kg.

10. The method of claim 1, wherein the second composition has a density of from 0.920 to 0.965 g/cc determined in accordance with ASTM D 1505 at 23° C.

11. The method of claim 1, wherein the first polymeric material is polyamide, and wherein the second polymeric material is a mixture of polyethylene, grafted polyethylene and ionomer.

12. The method of claim 11, wherein the rotomoulded article is a car door having an outside part prepared from the outer layer, wherein the polyamide of the outer layer is painted, and wherein car door has an inside part prepared from the mixture of polyethylene, grafted polyethylene and ionomer.

13. A method for preparing a rotomoulded article having asymmetrical layering comprising:
   heating one or more portions of a mould that are not thermally insulated, wherein one or more portions of the mould are thermally insulated;
   injecting a first polymeric material in the mould and submitting the mould to rotation about two perpendicular axes, wherein said first polymeric material forms an outer layer of the rotomoulded article for the one or more portions of the mould that are not thermally insulated, and wherein said first polymeric material comprises:
      from 40 to 100 wt % of homopolymers or copolymers of ethylene and/or propylene, and/or polyamide, and/or functional fluoropolymer or a mixture thereof; and
      from 0 to 60 wt % of a functionalised polyolefin (FPO) or of a polyolefin (PO) grafted to a non-polyolefin (NPO) in the form of a block copolymer ((PO)g-NPO) or of an ionomer or a combination thereof;
   removing the thermal insulation;
   injecting a second polymeric material in the mould and submitting the mould to rotation about two perpendicular axes, wherein the second polymeric material is different from the first polymeric material, wherein said second polymeric material forms an outer layer of the rotomoulded article for the one or more portions of the mould that were thermally insulated during the injection of the first polymeric material, and wherein said second polymeric material comprises:
      from 70 to 99 wt %, based on the weight of said second polymeric material, of a polyethylene resin; and
      from 1 to 30 wt % of an ionomer, or from 1 to 30 wt % of a combination of an ionomer and a grafted polyolefin;
   retrieving the rotomoulded article having asymmetrical layering;
   wherein the mould is heated through ducts designed to be run through by heat-regulating fluid, said ducts being realised by grooves on external surfaces of the mould and wherein the one or more portions of the mould that are not thermally insulated are heated whereas the one or more portions of the mould that are thermally insulated are cooled down.

14. The method of claim 13, wherein the first polymeric material is polyamide, and wherein the second polymeric material is a mixture of polyethylene, grafted polyethylene and ionomer.

15. A method for preparing a rotomoulded article having asymmetrical layering comprising:
   heating portions of a mould that are not thermally insulated, wherein one or more portions of the mould are thermally insulated;
   injecting a first polymeric material in the mould and submitting the mould to rotation about two perpendicular axes, wherein said first polymeric material forms an outer layer of the rotomoulded article for the portions of the mould that are not thermally insulated, and wherein said first polymeric material comprises:
      from 40 to 100 wt % of homopolymers or copolymers of ethylene and/or propylene, and/or polyamide, and/or functional fluoropolymer or a mixture thereof; and
      from 0 to 60 wt % of a functionalised polyolefin (FPO) or of a polyolefin (PO) grafted to a non-polyolefin (NPO) in the form of a block copolymer ((PO)g-NPO) or of an ionomer or a combination thereof;
   injecting a second polymeric material in the mould and submitting the mould to rotation about two perpendicular axes, wherein the second polymeric material is different from the first polymeric material, wherein said second polymeric material forms an outer layer of the rotomoulded article for the portion of the mould that was thermally insulated during the injection of the first polymeric material, and wherein said second polymeric material comprises:
      from 70 to 99 wt %, based on the weight of said second polymeric material, of a polyethylene resin; and
      from 1 to 30 wt % of an ionomer, or from 1 to 30 wt % of a combination of an ionomer and a grafted polyolefin;
   retrieving the rotomoulded article having asymmetrical layering;
   wherein thermally insulating the one or more portions of the mould is achieved by jacketing one or more portions of the mould and wherein the thermal insulation is removed after injection of the first polymeric material, or wherein thermally insulating the one or more portions of the mould is achieved by inserting one or more physical barriers into the mould that are molten after injection of the first polymeric material.

16. The method of claim 15, wherein thermally insulating one or more portions of the mould is achieved by jacketing one or more portions of the mould wherein the thermal insulation is removed after injection of the first polymeric material.

17. The method of claim 15, wherein thermally insulating one or more portions of the mould is achieved by inserting one or more physical barriers into the mould that are molten after injection of the first polymeric material.

18. The method of claim 17, wherein inserting the one or more physical barriers into the mould that are molten after injection of the first polymeric material comprises lining the one or more portions of the mould with the one or more physical barriers that separate the one or more portions of the mould that are thermally insulated from the one or more portions of the mould that are not thermally insulated.

19. The method of claim 15, wherein the first polymeric material is polyamide, and wherein the second polymeric material is a mixture of polyethylene, grafted polyethylene and ionomer.

* * * * *